UNITED STATES PATENT OFFICE.

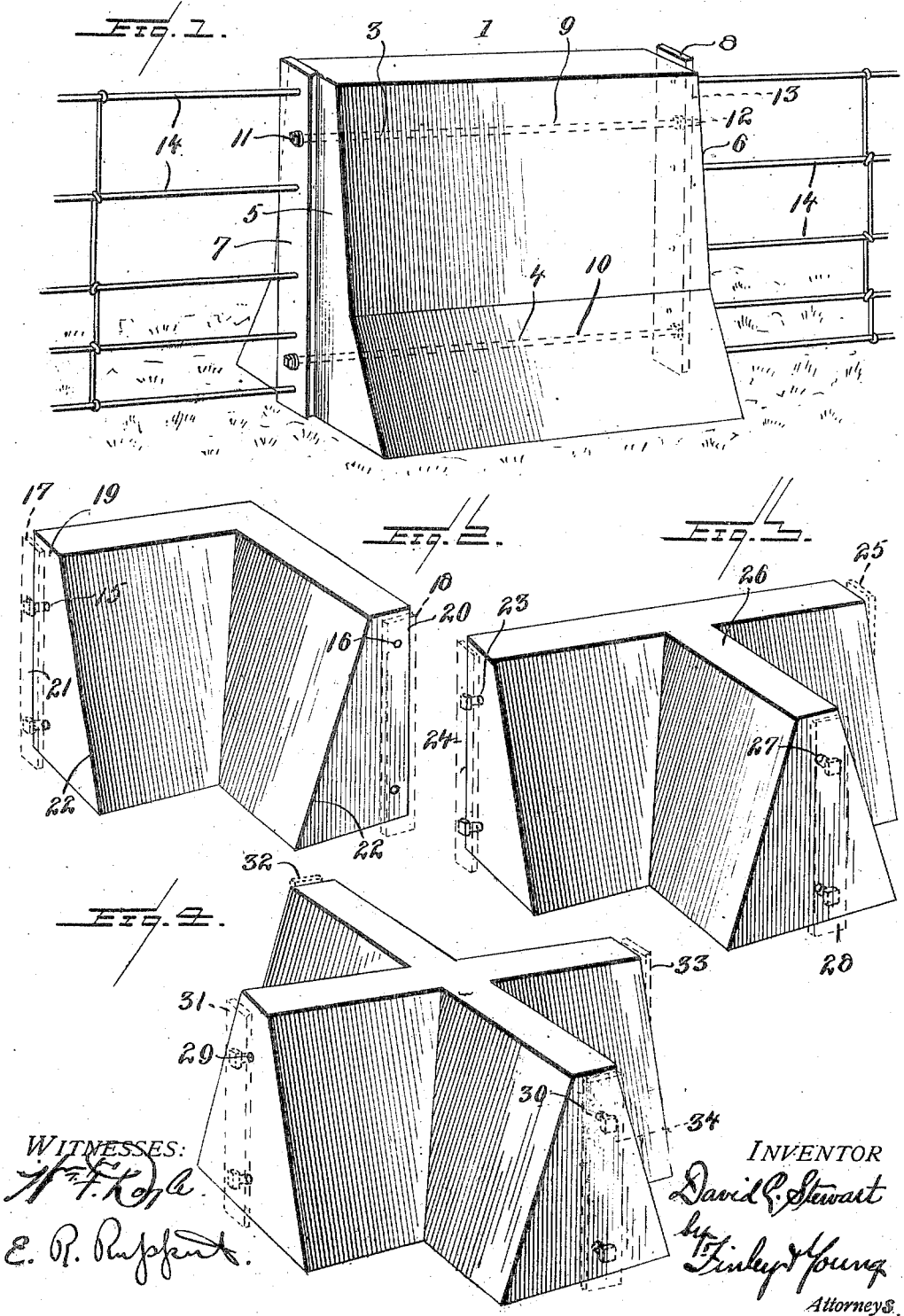

DAVID C. STEWART, OF PAYNE, OHIO.

COMPOSITION FENCE-POST.

No. 817,282. Specification of Letters Patent. Patented April 10, 1906.

Application filed February 10, 1906. Serial No. 300,533.

*To all whom it may concern:*

Be it known that I, DAVID C. STEWART, a citizen of the United States, residing at Payne, in the county of Paulding and State of Ohio, have invented a new and useful Improvement in Composition Fence-Posts, of which the following is a specification.

My invention relates to improvements in composition fence-posts.

The object of my invention is to provide a fence-post of this character which rests upon the surface of the ground and having means whereby the fence is readily attached thereto.

Another object of my invention is to provide means for tightening or loosening the fence as desired, so that the fence can be kept at the proper tension.

In the accompanying drawings, Figure 1 is a perspective view of a line-post, showing the fence attached thereto. Fig. 2 is a perspective view of a corner-post embodying my invention. Fig. 3 is a perspective view of a post embodying my invention and designed to be used at the intersection of two fences, and Fig. 4 is a perspective view of a post embodying my invention and designed to be used at the point of crossing of two fences.

Referring now to the drawings, 1 represents a post which, as shown, has a broad base 2 and tapering to its upper end. The post, as shown, rests with its broad base upon the surface of the ground and is preferably molded at the place where the post is to be used, so that it will rest more firmly upon the ground, although they could be molded and afterward placed at the desired point.

The post, as shown, is of a height equal to that of the fence to be erected and, as before stated, having its broad base tapering upward to its upper end, which is about one-third the width of that of the base. The post is of a length about twice its width and, as shown, is arranged lengthwise in a line with the running of the fence to prevent it from being tilted by the tension of the fence. The broad base also prevents the post from being tilted by any transverse strain upon the fence. By this construction it will be seen that a solid fence-post is formed and that the size of the same is regulated by the height of the fence, and the higher the fence the larger the post.

The post, it will be understood, is made of a composition of cement, sand, and broken stone or of any other desired composition and is molded with two transverse openings 3 and 4 extending lengthwise therethrough. The ends 5 and 6, as shown, are vertical and have arranged thereagainst the vertically-disposed standards 7 and 8, which are preferably of wood, although metal could be used. Passing through said standards and through the openings 3 and 4 in the composition post are tie-rods 9 and 10, which have one end provided with heads 11 and the oppsoite end screw-threaded at 12 and upon which are screwed the nuts 13 on the outside of the standard 8.

The fence 14, as clearly shown, is securely fastened to the standards 7 and 8, and by screwing up the nuts 13 upon the bolts it will be seen that the standards are drawn inwardly toward the composition post 1 and the fence is tightened to the desired extent. It is understood that the standards are a short distance from the composition post before the fence is attached, thus allowing for the proper tightening of the fence.

As shown in Fig. 2, the composition portion is made of a triangular form for a corner-post and is provided with openings 15, arranged at right angles to the openings 16, and the standards 17 and 18 are placed at the vertical ends 19 and 20. In this form the composition portion of the post has the outer vertical wall 21 and the inner oblique wall 22, forming a broader base and also forming a post which will not tilt from the strain of the fence at right angles.

The form shown in Fig. 3 is to be used at the intersection of two fences and is formed in a T shape and is provided with the two bolts 23, extending therethrough and by which the standards 24 and 25 are secured thereto, and the portion 26 has bolts 27 extending therethrough and by means of which the standard 28 is secured thereto for fastening the intersecting fence.

The form shown in Fig. 4 is to be used where two fences cross each other and is in the form of a cross, having bolts 29 and 30 for securing the four standards 31, 32, 33, and 34 thereto and to which are secured the four radiating sections of the two fences.

Having thus fully described my invention, what I claim as new, and desire to secure by Letters Patent, is—

1. A fence-post comprising a composition surface block, standards at opposite sides of the post, and tie-rods passing through the post and adjustably securing the standards to the post.

2. A fence-post comprising a composition surface block consisting of a large base tapering toward its upper end and having transverse openings therethrough standards on opposite sides of the post opposite the openings and to which the fence is secured, tie-rods passing through the standards and the openings in the post, and having heads on the outside of one standard and nuts screwed upon the opposite end of the rods on the outside of the other standard.

3. A fence-post, comprising a composition surface block having transverse openings therethrough, standards on the opposite side of the post opposite the openings and to which the fence is secured, bolts passing through the standards and the post and having heads on one end on the outside of one standard and screw-threaded ends passing through the other standard, and nuts on the said screw-threaded portion on the outside of the standard.

4. A fence-post, comprising a composition surface block having openings extending therethrough at right angles to each other, standards at opposite sides of the post opposite the openings, and tie-rods passing through the post and adjustably securing the standards to the post at right angles to each other.

In testimony whereof I have signed my name to this specification in the presence of two subscribing witnesses.

DAVID C. STEWART.

Witnesses:
 Don C. Corbett,
 Charles A. Reed.